US006337047B1

(12) United States Patent
Charkhutian et al.

(10) Patent No.: US 6,337,047 B1
(45) Date of Patent: Jan. 8, 2002

(54) PROCESS FOR DISPERSING IRON OXIDE IN STEAM GENERATING BOILERS

(75) Inventors: Kostan B. Charkhutian, Westwood; Bruce L. Libutti, Teaneck; Kaj D. Rondum, Budd Lake, all of NJ (US)

(73) Assignee: Ashland Inc., Covington, KY (US)

( * ) Notice: Subject to any disclaimer, the term of this patent is extended or adjusted under 35 U.S.C. 154(b) by 0 days.

(21) Appl. No.: 09/183,428

(22) Filed: Oct. 30, 1998

(51) Int. Cl.[7] .................................................. C23F 11/16

(52) U.S. Cl. ......................... 422/15; 210/700; 252/180; 422/16

(58) Field of Search ..................... 422/15, 16; 210/700; 252/180

(56) References Cited

U.S. PATENT DOCUMENTS

| | | | | |
|---|---|---|---|---|
| 3,289,734 A | | 12/1966 | Robertson | 159/47 |
| 4,255,259 A | | 3/1981 | Hwa et al. | 210/699 |
| 4,288,327 A | | 9/1981 | Godlewski et al. | 210/698 |
| 4,306,991 A | | 12/1981 | Hwa et al. | 252/180 |
| 4,581,145 A | | 4/1986 | Cuisia et al. | 210/699 |
| 5,454,954 A | * | 10/1995 | Alfano et al. | 210/700 |
| 6,077,440 A | | 6/2000 | Roe et al. | 210/699 |

* cited by examiner

*Primary Examiner*—Krisanne Thornton
(74) *Attorney, Agent, or Firm*—David L. Hedden

(57) ABSTRACT

This invention relates to a process for dispersing corrosion products, specifically iron oxide, in steam generating boilers. Improved dispersion is achieved by adding a dispersant to a feedpoint of the steam generating boiler where the composition comprises: (a) a copolymer of sulfonated styrene and maleic anhydride or maleic acid; and (b) diethylenetriamine penta (methylene phosphonic acid).

8 Claims, No Drawings

PROCESS FOR DISPERSING IRON OXIDE IN STEAM GENERATING BOILERS

FIELD OF THE INVENTION

This invention relates to a process for dispersing corrosion products, specifically iron oxide, in steam generating boilers. Improved dispersion is achieved by adding a dispersant to a feedpoint of the steam generating boiler where the composition comprises: (a) a copolymer of sulfonated styrene and maleic anhydride or maleic acid; and (b) diethylenetriamine penta (methylene phosphonic acid).

BACKGROUND OF THE INVENTION

Iron oxide and other corrosive deposits in steam generating boilers are formed by the corroding of metal tubes in the steam generating boiler. Corrosion product deposits must not be confused with scale and sludge. Scale and sludge result from the precipitation of impurities (e.g. carbonates), found in the boiler feedwater, on the metal surfaces of the steam generating boiler. The formation and treatment of corrosion product deposits and scale differ significantly.

Corrosion products, particularly iron oxide, can cause fouling of the boiler and related equipment which reduces heat transfer rates. These deposits predominate over scale in boilers with demineralized makeup and a high rate of condensate return. This is particularly a problem in high-pressure steam boilers operating at pressures greater than about 600 psi. High-pressure steam boilers do not tolerate corrosion deposits on the hot side of waterside boiler tubes in the generating section of the steam generating boiler very effectively. Thus steam generating boilers which operate at high pressures demand a corrosion product deposit inhibition program which performs optimally and will not require the added expense of frequent cleaning.

Because it so important to reduce iron oxide corrosion product deposits in steam generating boilers, condensate polishers are used in many steam generating plants. This is one way to avoid more frequent cleaning remove deposits and the increased expense associated with such cleaning.

It is also known to use oxygen scavengers to inhibit corrosion on the metal surfaces of steam condensate return lines and preboiler piping. This in turn reduces the loading of corrosion products in the associated steam generating boilers. See, for instance, U.S. Pat. No. 4,487,745. Oximes control corrosion in the feedwater circuit by scavenging oxygen and establishing a corrosion-resistant oxide film on metallic surfaces.

Although the formation and prevention of scale and sludge build up in steam boilers, is not analogous to the formation and prevention of iron oxide corrosion product deposits, it is known that scale and sludge build up can be prevented by injecting water soluble organic phosphates and/or copolymers of sulfonated styrene and maleic anhydride (SSMA) into a feeedpoint of steam generating boiler. For instance, the combination of SSMA and an organic phosphate is disclosed in U.S. Pat. No. 4,255,259 and U.S. Pat. No. 4,306,991 as a scale and sludge inhibitor. Although the term "organic phosphate" is generic and includes scores of compounds, these patents clearly teach that the preferred organic phosphate is 1,1,1,-diphosphonic acid (HEDPA). These patents do name diethylenetriamine penta (methylene phosphonic acid) as an organic phosphate, and disclose by example a mixture of SSMA and diethylenetriamine penta (methylene phosphonic acid) to reduce the formation of scale or sludge. However, they do not suggest the use of such a mixture as a iron oxide dispersant for steam generating boilers.

SUMMARY OF THE INVENTION

This invention relates to a process for dispersing the corrosion products, particularly iron oxide, in steam generating boilers, where said process comprises:

injecting an effective amount of a dispersant into a steam generating boiler wherein said dispersant comprises:
- (a) a copolymer of sulfonated styrene and maleic anhydride or maleic acid; and
- (b) diethylenetriamine penta (methylene phosphonic acid), such that the weight ratio of (a) to (b) is from 1:10 to 10:1.

The addition of the iron oxide dispersant causes iron oxide to remain in suspension in the aqueous process streams of the boiler rather than being deposited as corrosion on the metal surfaces of the steam boiler, e.g. tubing. The use of the mixture as an iron oxide dispersant is synergistic. The combination of (a) and (b) is more effective than if these components are used individually as an iron oxide dispersant. The process is particularly useful for steam boilers where the pressure is above 600 psig.

BEST MODE AND OTHER MODES

One of the components of the iron oxide dispersant is a copolymer of styrene sulfonic acid and maleic anhydride and/or maleic acid (SSMA), and salts thereof. The SSMA copolymers used in the process include those disclosed in U.S. Pat. Nos. 3,289,734 and 4,306,991 which are hereby incorporated into this disclosure by reference. The method of preparing these copolymers are well known in the art. A typical synthesis is shown in U.S. Pat. No. 4,118,318 which is hereby incorporated by reference into this disclosure. The average molecular weight of such copolymers is typically from 1,000 to 7,000,000, preferably from 5,000 to 1,000, 000, most preferably from 10,000 to 100,000.

The ratio of styrene sulfonic acid to maleic anhydride/maleic acid used to prepare the copolymers is from 20:1 to 1:20, preferably 10:1 to 1:10, most preferably 5:1 to 1:5. Blends of SSMA copolymers and other polymers such as polymethacrylates can also be used such that the weight ratio of SSMA copolymer to other polymer is from 1:10 to 10:1.

Diethylenetriamine penta (methylene phosphonic acid) (DPPA) is represented by the following chemical structural formula:

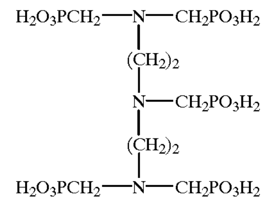

The weight ratio of SSMA to DPPA is from 20:1 to 1:20, preferably from 10:1 to 1:10, most preferably from 5:1 to 1:5. The amount of iron oxide dispersant used typically ranges from 1 to 20 ppm, preferably from 5 to 15 ppm. The dispersant composition can be injected at any feedpoint in the steam boiler, but is preferably injected in the feedwater.

Optional components of the dispersant composition are alkali phosphate for boiler water pH control. Other polymers such as polymethacrylates can be added for dispersion.

The structure of DPPA should be contrasted with the structure of 1-hydroxyethylidene, 1,1,-diphosphonic acid (HEDPA) which is the preferred organic phosphate shown in U.S. Pat. No. 4,255,259 and U.S. Pat. No. 4,306,991.

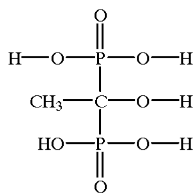

ABBREVIATIONS AND DEFINITIONS

DPPA=diethylenetriamine penta (methylene phosphonic acid).

SSMA=copolymer of sulfonated styrene and maleic anhydride, having an average molecular weight of 20,000 sold by Alco Chemical, Chatanooga, Tenn.

Iron oxide=iron oxide including iron oxide in all of its forms, i.e. magnetite, hematite, and rust which result from the corrosion of metals in the boiler.

Dispersing=process by which iron oxide corrosion products are kept in suspension in the boiler water.

Scale=minerals from make up water which deposit on metal tubes of boiler.

EXAMPLES

A 0.2 gram quantity of iron oxide is added to 100 mL of a deionized water solution of known concentration of dispersant(s). A control is prepared by adding 0.2 gram of iron oxide to 100 mL of water without any dispersant (s). Both solutions are neutralized to a pH of about 10.5, then shaken for a total of 21 minutes. Portions are withdrawn from both suspensions and transferred into spectrophotometer cells. After five minutes the control is used to zero the spectrophotometer, and the absorbance of the suspension that contains the dispersant(s) is read at 450 nm. Higher absorbance values indicate improved dispersion. The amount of the components in the iron oxide dispersant is based on the active solids.

In Table I, DPPA and SSMA were tested as well as mixtures thereof.

TABLE I

ABSORBANCE VALUE DISPERSANT FOR DDPA AND SSMA

| DISPERSANT FORMULATION | AMOUNT (ppm) | ABSORBANCE VALUE | INCREASED ABSORBANCE OVER BLANK |
|---|---|---|---|
| Control | 0 | 0.1133 | — |
| DPPA | 5 | 0.1909 | 0.0776 |
| SSMA | 5 | 0.2407 | 0.1274 |
| SSMA/DPPA | 5/5 = 10 | 0.4124 | 0.2991 |

The data indicate that there is a synergistic effect in using a combination of SSMA and DPPA. The mixture of SSMA and DPPA disperses almost 4 times as much as DPPA alone and over 2 times as much as SSMA alone when compared to the blend. Therefore, one would expect the mixture of SSMA and DPPA to disperse iron oxide much more effectively in a steam boiler.

Table II shows the results of experiments using HEDPA instead of DPPA.

TABLE II

ABSORBANCE VALUE DISPERSANT FOR HEDPA AND SSMA

| DISPERSANT FORMULATION | AMOUNT (ppm) | ABSORBANCE VALUE | INCREASED ABSORBANCE OVER BLANK |
|---|---|---|---|
| Control | 0 | 0.1102 | — |
| HEDPA | 5 | 0.1608 | 0.0506 |
| SSMA | 5 | 0.2407 | 0.1305 |
| SSMA/HEDPA | 5/5 = 10 | 0.2558 | 0.1456 |

The data in Table II do not show a synergistic effect of using SSMA and HEDPA. SSMA alone works almost as effectively as the mixture of SSMA and HEDPA.

In Table III, the results are show for blends of SSMA/HEDPA and SSMA/DPPA.

TABLE III

ABSORBANCE VALUE DISPERSANT BLENDS OF SSMA/HEDPA AND SSMA/DPPA

| DISPERSANT FORMULATION | AMOUNT (ppm) | ABSORBANCE VALUE | INCREASED ABSORBANCE OVER BLANK |
|---|---|---|---|
| Control | 0 | 0.1102 | — |
| SSMA/HEDPA COMPARISON | 5/5 = 10 | 0.2558 | 0.1456 |
| SSMA/DPPA | 5/5 = 10 | 0.4124 | 0.3022 |

The data indicate that there is a synergistic effect in using a combination of SSMA and DPPA. The blend of SSMA/DPPA absorbed over two times more than the blend SSMA/HEDPA when compared to the blank. This indicates that the blend of SSMA/DPPA will more effectively disperse iron oxide in the process stream of a steam boiler.

We claim:

1. A process for dispersing corrosion products, iron oxide, in steam generating boilers, wherein said process comprises:

injecting an effective amount of a dispersant into a steam generating boiler wherein said dispersant comprises:

(a) a copolymer of sulfonated styrene and maleic anhydride or maleic acid; and (b) diethylenetriamine penta (methylene phosphonic acid), such that the weight ratio of (a) to (b) is from 20:1 to 1:20.

2. The process of claim 1 wherein (a) has an average molecular weight of from 5,000 1,000,000.

3. The process of claim 2 wherein the ratio of styrene sulfonic acid to maleic anhydride/maleic acid used to prepare (a) is 10:1 to 1:10.

4. The process of claim 3 wherein the ratio of (a) to (b) is from 1:5 to 5:1.

5. The process of claim 4 wherein (a) has an average molecular weight of from 10,000 100,000.

6. The process of claim 5 wherein the ratio of styrene sulfonic acid to maleic anhydride/maleic acid used to prepare (a) is 5:1 to 1:5.

7. The process of claim 6 wherein the feedpoint for the dispersant is the boiler feedwater.

8. The process of claim 7 wherein the steam generating boiler is a boiler operating at a pressure above 600 psig.

* * * * *